(12) United States Patent
Heindl

(10) Patent No.: US 7,111,867 B2
(45) Date of Patent: Sep. 26, 2006

(54) AIRBAG MODULE AND VEHICLE STEERING WHEEL COMPRISING AN AIRBAG MODULE

(75) Inventor: Ralf Heindl, Aschaffenburg (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 278 days.

(21) Appl. No.: 10/152,526

(22) Filed: May 21, 2002

(65) Prior Publication Data

US 2002/0175505 A1 Nov. 28, 2002

(30) Foreign Application Priority Data

May 22, 2001 (DE) .......................... 201 08 596

(51) Int. Cl.
*B60R 21/16* (2006.01)

(52) U.S. Cl. ........................................ 280/731
(58) Field of Classification Search ............. 280/731, 280/777
See application file for complete search history.

(56) References Cited

U.S. PATENT DOCUMENTS

| | | | | |
|---|---|---|---|---|
| 5,593,178 A | * | 1/1997 | Shiga et al. | ........ 280/731 |
| 5,721,409 A | * | 2/1998 | Enders | ........ 200/61.54 |
| 5,772,239 A | * | 6/1998 | Seymour | ........ 280/728.3 |
| 5,826,901 A | | 10/1998 | Adomeit | |
| 6,149,189 A | | 11/2000 | Kreile | |
| 6,352,280 B1 | * | 3/2002 | Derrick | ........ 280/728.2 |
| 6,457,379 B1 | * | 10/2002 | Mirone | ........ 74/552 |
| 6,491,319 B1 | * | 12/2002 | Bonn | ........ 280/731 |

FOREIGN PATENT DOCUMENTS

| | | |
|---|---|---|
| DE | 9205252.5 | 7/1992 |
| DE | 4430588 | 10/1995 |
| DE | 29720139 | 4/1998 |
| EP | 560355 A1 * | 9/1993 |
| EP | 0572125 | 12/1993 |
| GB | 2309123 | 7/1997 |
| GB | 2325900 | 12/1998 |
| WO | 98/02337 | 1/1998 |

* cited by examiner

*Primary Examiner*—Son T. Nguyen
(74) *Attorney, Agent, or Firm*—Tarolli, Sundheim, Covell & Tummino L.L.P.

(57) ABSTRACT

The invention relates to an airbag module that is integrated into a steering wheel and that can be moved relative to the steering wheel in order to actuate a horn. The airbag module comprises a horn switch provided on the module which, when the module is moved, is transferred into a switching position that causes the horn to be activated. A hollow profile made of elastomer is provided which is equipped with the horn switch and lies against the module. The invention further relates to a vehicle steering wheel equipped with such an airbag module.

12 Claims, 1 Drawing Sheet

AIRBAG MODULE AND VEHICLE STEERING WHEEL COMPRISING AN AIRBAG MODULE

TECHNICAL FIELD

The invention relates to an airbag module that is integrated into a steering wheel and that can be moved relative to the steering wheel in order to actuate the horn.

Moreover, the invention relates to a vehicle steering wheel comprising an airbag module according to the invention.

BACKGROUND OF THE INVENTION

Known airbag modules comprise a horn switch provided on the module which, when the module is moved, is transferred into a switching position that causes the horn to be activated. Airbag modules of this type are also referred to as "floating horn modules" since they are mounted on the steering wheel so as to move axially. There is usually a first switching contact on the rear side of the module and a second switching contact on the hub plate of the steering wheel, and these contacts touch each other when the module is moved from an initial position into a position for actuating the horn. In order to reset the module, there is at least one return spring on the back between the module and the steering wheel.

BRIEF SUMMARY OF THE INVENTION

The invention provides an airbag module that stands out for its low-noise switching actuation and few individual parts as well as for its easy assembly.

This is achieved with an airbag module that is integrated into a steering wheel and that can be moved relative to the steering wheel in order to actuate a horn. The airbag module comprises a horn switch provided on the module which, when the module is moved, is transferred into a switching position that causes the horn to be activated. A hollow profile made of elastomer is provided which is equipped with the horn switch and lies against the module. The airbag module according to the invention does not have an ordinary switch but rather a hollow profile which is provided with a horn switch and in which there are, for example, electrically conductive sections that come into contact with each other when the hollow profile is compressed. Contact conductors can also be installed, for example, inside the hollow profile on opposite sections or integrated into the hollow profile, which conductors come into contact with each other when the hollow profile is compressed through movement of the module. The integration of the contact elements into the hollow profile also provides corrosion protection. The number of individual parts to be mounted is reduced, since the hollow profile, along with the integrated horn switch, is normally made up of one individual part.

According to the preferred embodiment, the hollow profile is situated on the rear side of the module and is designed in such a way that it strives to push the module back into its original position after the horn has been actuated. This means that the hollow profile assumes an additional function in that it assists or preferably totally replaces the return spring that had been provided up until now, and it alone ensures the resetting of the module.

The hollow profile can take over another function, namely a sealing function. It should be ensured that, if possible, none of the gas generated in the gas generator that is accommodated in the module can escape from the rear side of the module. Instead, all of the generated gas should flow into the airbag. For this purpose, complex gaskets on the rear side of the module have been contemplated, which are replaced by the hollow profile. This is due to the fact that the hollow profile is situated on or in the module in such a way that it seals off a gap through which the gas from the module could escape. For this purpose, the hollow profile preferably extends like a ring and continuously along the rear side of the module.

The hollow profile can accommodate, for example, a sensor, that forms the horn switch. Contacts can be attached to the hollow profile or integrated into the profile as already explained above.

The vehicle steering wheel according to the invention has a horn switch and in particular also an airbag module according to the invention. In order to reduce the number of parts to be assembled, the horn switch is provided with a hollow profile made of elastomer material.

When the airbag module according to the invention is provided, the hollow profile is situated between the module and the steering wheel. Moreover, on the hollow profile, there can be provided a sealing lip that lies against the steering wheel and improves the sealing effect.

Another embodiment provides for that the hollow profile is laterally guided in such a way that a lengthwise guidance is created for the entire module. In this embodiment, the hollow profile assumes another function, namely, a guide function in the lengthwise direction, i.e. in the direction of the axis of the steering wheel.

DETAILED DESCRIPTION OF THE PREFERRED EMBODIMENTS

Figure 1:
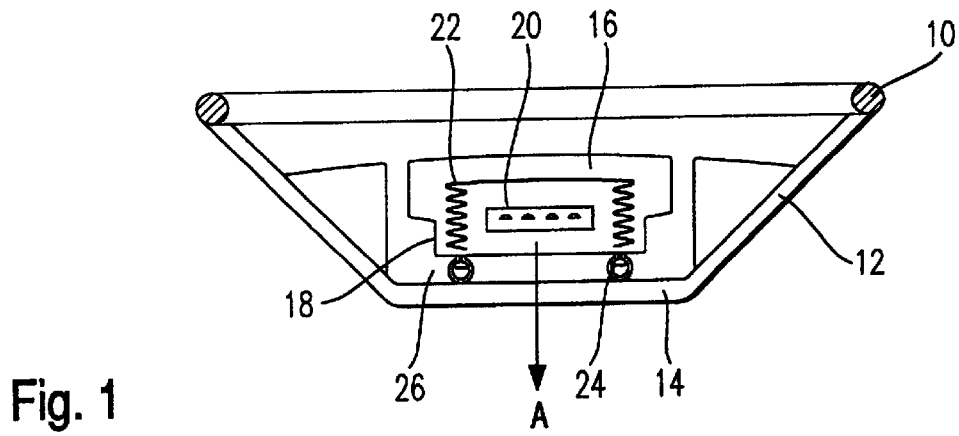
FIG. 1 shows a schematic cross-sectional view through a vehicle steering wheel according to the invention with an airbag module according to the invention.
Figures 2, 3:
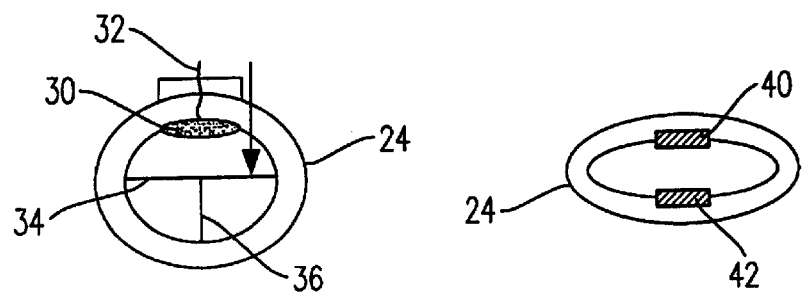
FIGS. 2 and 3 are cross-sectional views of various embodiments of the hollow profile used in the vehicle module according to the invention.

FIG. 1 shows a vehicle steering wheel having a steering wheel rim 10, spokes 12 and a hub plate 14. An airbag module 16 is attached in the area of the hub plate 14, directly on the hub plate 14 or on metal attachment pieces not explicitly shown here. The airbag module 16 has a housing 18 in which a gas generator 20 and an airbag 22 that is inflated by the generator 20 are accommodated. Attached to the rear side of the housing 18 is a hollow profile 24 the cross-section of which is closed and that is clamped between the top of the hub plate 14 and the rear side of the module 16. The hollow profile is shown in FIGS. 2 and 3 in various embodiments. The hollow profile extends in a closed ring shape, so that a gap 26 that exists between the rear side of the module and the hub plate 14 is sealed off and gas that is generated by the gas generator 20 and that partially escapes from the rear side of the module housing 18 cannot lead to major leakage losses since the hollow profile 24 prevents the gas from flowing through the gap 26.

The hollow profile is provided with a horn switch that is actuated whenever the driver pushes the module in the direction of the arrow A, i.e. in the direction of the axis of the steering wheel.

For this purpose, a sensor or the like is attached in the hollow profile 24 or the sensor is integrated therein. According to FIG. 2, on the inside of a section, a contact surface 30 is attached to the hollow profile 24 (e.g. by means of adhesion). The contact surface 30 is associated with a contact line 32. Inside the hollow profile there is further attached a contact surface 34 which is at a distance from the contact surface 30 in the non-actuated position and comprises an associated line 36. If the module is moved in the direction of the arrow A, the elastic hollow profile 24 is compressed (see arrow in FIG. 2), so that the contact surfaces 30, 34 touch each other and a current circuit is closed, which leads to the activation of the horn.

The hollow profile 24 has such an elasticity that, after the horn actuation, it pushes the entire module 16 back into the non-actuated position, i.e. into the initial position. Consequently, there is no need for return springs.

The integration of the horn switch into the hollow profile can also be done as shown in FIG. 3. In this embodiment, contact strips 40, 42 are integrated inside the elastomer on opposite upper and lower sections thereof, for example, by partial injection-molding, the contact strips likewise coming into contact with each other when the hollow profile 24 is compressed.

Figure 4:
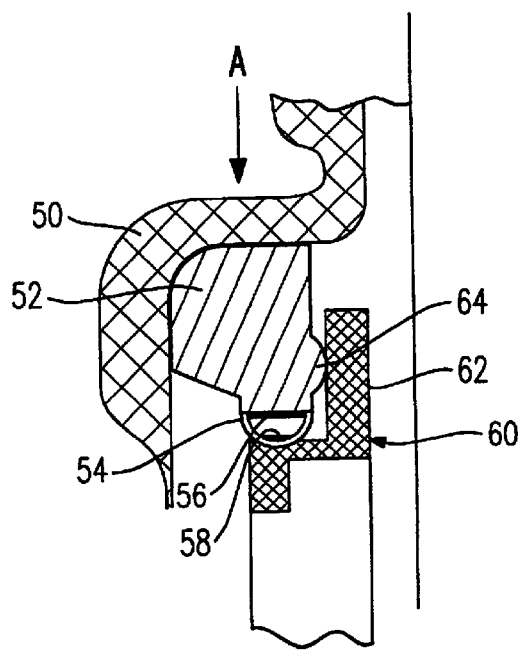
FIG. 4 is an enlarged cross-sectional view through a section of the module according to the invention and of the steering wheel in the area of a hollow profile.

In the embodiment according to FIG. 4, the hollow profile is attached to a projection 50 on the rear side of the module housing 18. The hollow profile has a relatively massive section 52 that has the hollow profile section 54 formed on its lower end. The hollow profile here is semi-circular in shape. The contact surfaces are designated as 56 and 58. An additional sealing ring 60 is attached on the steering wheel side, the ring having a surrounding wall 62 on the inside of which there is a projection that functions as a sealing lip 64 on the one hand and as a guide surface on the other hand, since, when the module moves downward in the direction of the arrow A, the sealing lip 64 moves along the inside of the wall 62, as a result of which the module is guided lengthwise.

As an alternative, the hollow profile of the steering wheel according to the invention could also be situated below a horn surface which is not provided by the module but rather is situated laterally on the module. With this embodiment as well, the hollow profile would comprise the horn switch and would ensure the resetting of the switch.

What is claimed is:

1. A vehicle steering wheel comprising a hub plate, an airbag module integrated into e the steering wheel and able to be moved relative to said hub plate in order to actuate a horn, a hollow profile made of elastomer provided on said airbag module, said hollow profile comprising a horn switch which, when said module is moved, is transferred into a switching position that causes said horn to be activated, and a lateral wall coupled with said hub plate and arranged radially adjacent to said hollow profile, said lateral wall guiding said hollow profile and said module when said hollow profile moves along said lateral wall on displacement of the module to activate said horn, wherein said lateral wall is lateral with respect to a rotating axis of said sterring wheel.

2. The vehicle steering wheel according to claim 1, wherein a sealing lip is provided on said hollow profile.

3. The vehicle steering wheel according to claim 1, wherein said hollow profile is situated on a rear side of said module and is configured in such a way that it strives to push said module back into its original position after said horn has been actuated.

4. The vehicle steering wheel according to claim 1, wherein said module is reset to said original position by means of said hollow profile.

5. The vehicle steering wheel according to claim 1, wherein a sensor that forms said horn switch is situated in said hollow profile.

6. The vehicle steering wheel according to claim 1, wherein said hollow profile is provided with electrical contacts that are attached to said hollow profile.

7. The vehicle steering wheel according to claim 1, wherein said hollow profile is provided with electrical contacts that are integrated into said hollow profile.

8. A vehicle steering wheel comprising a hub plate, an airbag module integrated into the steering wheel and able to be moved relative to said hub plate in order to actuate a horn, a hollow profile made of elastomer provided on said airbag module, said hollow profile comprising at least one horn switch which, when said module is moved, is transferred into a switching position that causes said horn to be activated, a sealing lip defining a portion of said hollow profile, said sealing lip being spaced apart from that portion of the hollow profile having said at least one horn switch, said sealing lip sealing said air bag module against escaping gas generated within said air bag module.

9. The vehicle steering wheel according to claim 8, wherein said sealing lip is arranged on a lateral side of said hollow profile.

10. The vehicle steering wheel according to claim 9, wherein said sealing lip abuts against a lateral wall coupled to said hub plate and is guided along said lateral wall when said module is moved, wherein said lateral wall is lateral with respect to a rotating axis of said steering wheel.

11. The vehicle steering wheel according to claim 9, wherein said lateral wall is arranged radially outwards from the sealing lip.

12. The vehicle steering wheel according to claim 9, wherein said hollow profile further comprises portions holding electrical contacts of said horn switch, wherein said sealing lip is spaced apart from said portions.

* * * * *

UNITED STATES PATENT AND TRADEMARK OFFICE
CERTIFICATE OF CORRECTION

| | | |
|---|---|---|
| PATENT NO. | : 7,111,867 B2 | Page 1 of 1 |
| APPLICATION NO. | : 10/152526 | |
| DATED | : September 26, 2006 | |
| INVENTOR(S) | : Ralf Heindl | |

It is certified that error appears in the above-identified patent and that said Letters Patent is hereby corrected as shown below:

Column 3, line 49, after "into" delete "e".

Signed and Sealed this

Twenty-ninth Day of May, 2007

JON W. DUDAS
*Director of the United States Patent and Trademark Office*